United States Patent
Khosravi et al.

(10) Patent No.: US 7,363,473 B2
(45) Date of Patent: Apr. 22, 2008

(54) SYSTEM FOR DYNAMIC SERVICE PROVISIONING

(75) Inventors: Hormuzd M. Khosravi, Portland, OR (US); Bernie Keany, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 10/938,141

(22) Filed: Sep. 10, 2004

(65) Prior Publication Data
US 2006/0095580 A1    May 4, 2006

(51) Int. Cl.
*G06F 9/44*    (2006.01)
(52) U.S. Cl. .......................... 712/226; 712/34
(58) Field of Classification Search ................ 712/226, 712/34, 35, 15, 203, 36, 225
See application file for complete search history.

(56) References Cited

U.S. PATENT DOCUMENTS

| | | | | |
|---|---|---|---|---|
| 5,327,560 A | * | 7/1994 | Hirata et al. | 709/221 |
| 6,640,220 B1 | * | 10/2003 | Firlit et al. | 707/3 |
| 7,076,595 B1 | * | 7/2006 | Dao et al. | 710/317 |
| 7,103,881 B2 | * | 9/2006 | Stone | 717/148 |
| 2002/0126659 A1 | * | 9/2002 | Liu et al. | 370/357 |
| 2004/0125750 A1 | * | 7/2004 | Katti et al. | 370/252 |

* cited by examiner

*Primary Examiner*—Eric Coleman
(74) *Attorney, Agent, or Firm*—Marger Johnson & McCollom, PC (57) ABSTRACT

Disclosed is a network processor configured to provide for dynamic service provisioning. A global connector defines a topology of packet processing functions that can be dynamically ordered to provide varying functionality. The global connector may be configured before or during the operation of the network processor. Such a system allows a network processor to provide additional functionality in a relatively easy manner, without necessitating changes to the packet processing functions themselves. Such dynamic service provisioning may include dynamic topology changes, which allows a network processor to reconfigure the structure or operation of multiple processing elements of the processor.

24 Claims, 5 Drawing Sheets

SYSTEM FOR DYNAMIC SERVICE PROVISIONING

TECHNICAL FIELD

This disclosure is directed toward network processors, and, more particularly, to a system for dynamically configuring and/or reconfiguring a network processor to provide additional functionality.

BACKGROUND OF THE INVENTION

Network processors are used in a wide variety of products, such as switches, broadband access platforms, web switches, protocol converters, Quality of Service (QoS) provisioning, filtering, firewalls, Virtual Private Networks (VPNs), load balancing, remote monitoring, and intrusion detection, etc. Network processors generally receive a relatively high volume of input data in the form of network packets and perform different operations on the packets depending on the particular network product the processor (or processors) is in.

Some network processors, such as the INTEL IXP (Internet Exchange Processor) family of network processors are programmable. These processors include a number of microengines structured to perform certain tasks. For example, microengines can be small, multi-threaded RISC (Reduced Instruction Set Computer) processors that are capable of being programmed to perform a particular function. The network processors also include one or more Core processors such as the Xscale core which can be used to control the microengines.

Microblocks, as used in this disclosure, are elementary functional units that provide packet processing functionality and operate on a microengine. By themselves, microblocks have limited functionality because they are so specialized. By associating multiple microlocks together, however, more sophisticated functions and powerful network processes can be produced. Typically, a single microengine runs multiple microblocks simultaneously to implement the desired function. The microblocks also have corresponding Core components which reside on the core processor.

Microengines can be programmed to implement microblocks in any conventional manner, such as by loading instructions into the RISC processor from a memory. Typical microengines are programmed by loading instructions from a non-volatile (Flash or EEPROM) memory, although instructions for programming the microengine could be loaded through any acceptable process.

Figure 1:
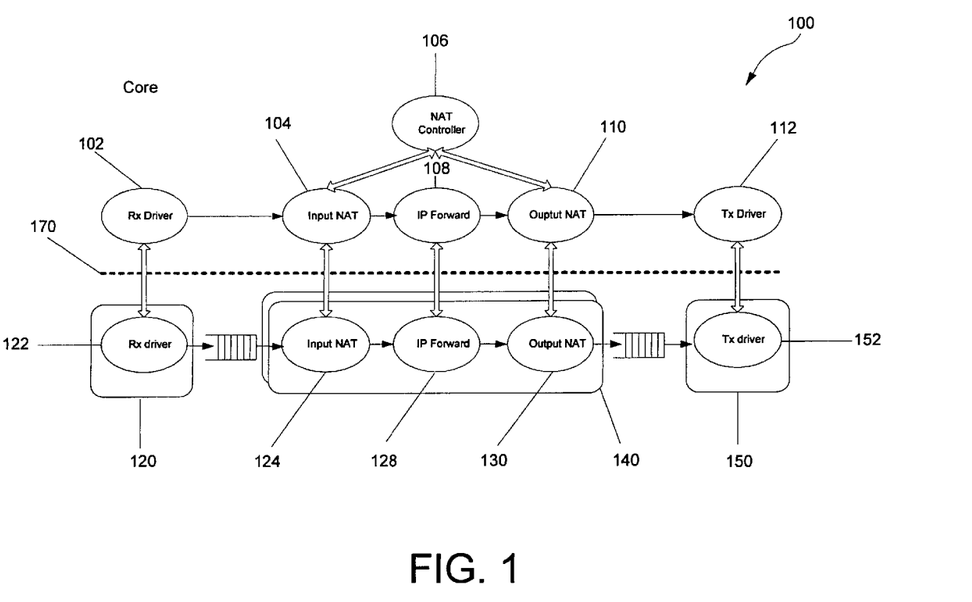
FIG. 1 is a block diagram of a conventional functional block operating on a network processor.

FIG. 1 is a functional block diagram of a network processor 100 including microblocks. Within the processor 100, a microengine 140 includes three microblocks, 124, 128, and 130. The microblock 124 is programmed to perform input Network Address Translation (NAT). The microblock 128 performs IP forwarding, while the microblock 130 performs output NAT. Although their singular functionality is limited, when the microblocks 124, 128, 130 operate together, the microengine 140 is capable of performing complex and useful functions. 104, 108, 110 are Core components corresponding to the Input NAT, IP forward, Output NAT microblocks.

Implementing the microengine 140 to connect multiple microblocks into a group or chaining microblocks to form a function can be performed by suitably configuring a component operating on a core controller and appropriately programming the microengine 140. With reference to FIG. 1, an NAT controller 106 is configured to implement the function of the microengine 140 by configuring the Core components 104, 106, i.e., the NAT controller 106 controls how the microblocks 124, 128, and 130 interact with one another. Additionally, the programmed microengine 140 operates in conjunction with the NAT controller 106, as illustrated in FIG. 1. Presently, to add new functions to the network processor 100, additional core components must be added, each statically configured at compile time to control a topology of a collection of programmed microblocks running on a microengine.

Embodiments of the invention address these and other limitations of the prior art.

DETAILED DESCRIPTION OF THE INVENTION

Inventive principles illustrated in this disclosure are not limited to the specific details and illustrated embodiments disclosed herein.

Figure 2:
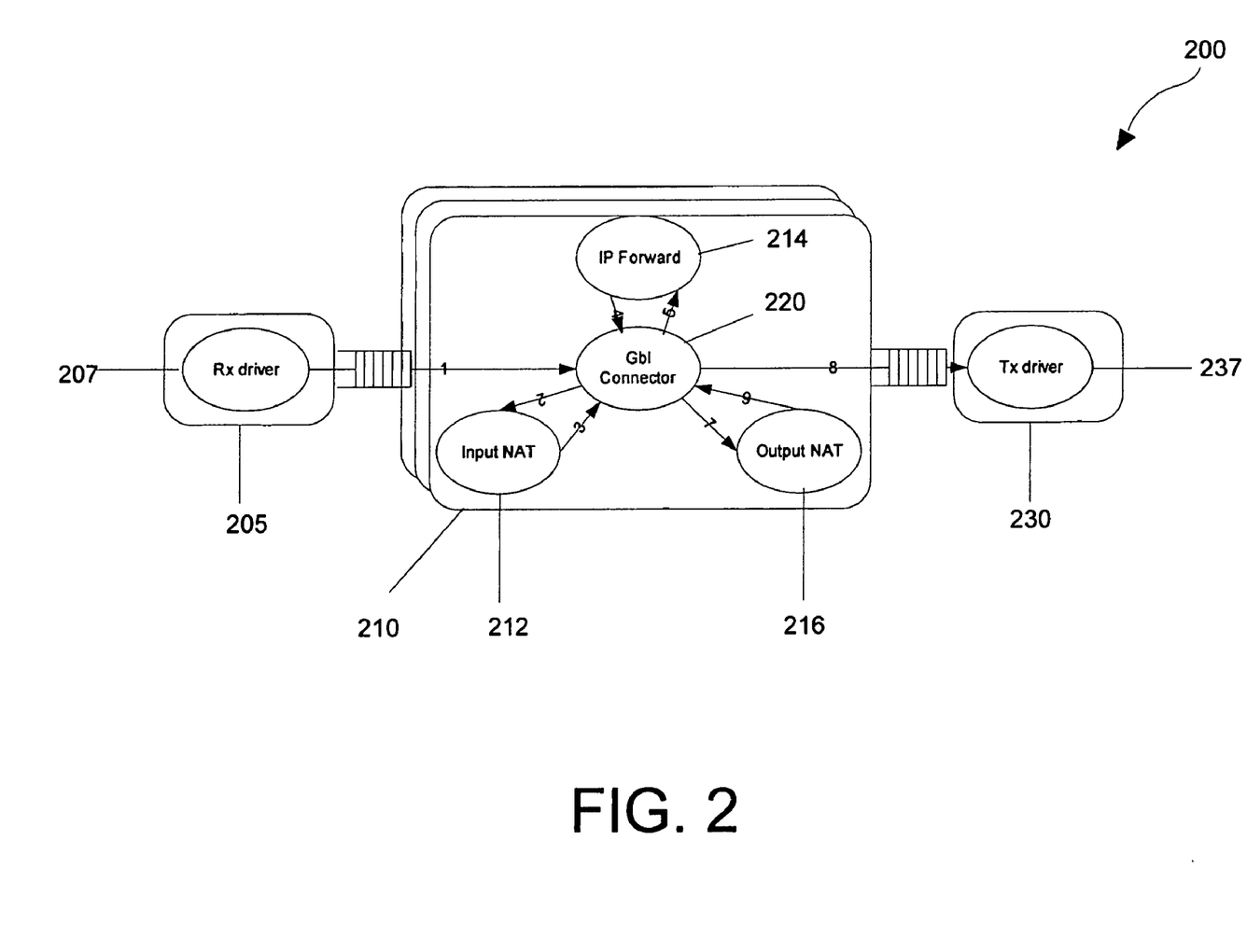
FIG. 2 is a block diagram of a network address translation application implemented on a network processor using dynamically configurable microblocks according to embodiments of the invention.

FIG. 2 is a functional block diagram of components of a network processor 200 according to embodiments of the invention. The network processor 200 includes a microengine 205 configured to implement a microblock 207, which is configured as a receiving driver. The network processor 200 also includes a microengine 230 which is configured to implement a microblock 237, which is configured as a transmitting driver. The microengines 205 and 230 differ from a microengine 210 in that the microengines 205 and 230 each implement a single microblock, i.e, 207 and 237, respectively.

In operation, the receiving driver 207 receives data packets and the microengine 210 causes a function or operation to be performed on the packets as they are received. Once the operation has been performed, the packets are sent to the transmitting driver 237 to be transmitted to another portion of the network processor 200, or perhaps out of the processor completely.

The microengine 210 includes a number of microblocks, such as an input NAT 212, an IP forward 214, and an output NAT 216. A global connector 220 is another microblock structured to dynamically configure the topology of the microblocks 212, 214, and 216. In other words, according to embodiments of the invention, the functionality of the microengine 210 can be dynamically changed by reconfiguring the microengine 210. More specifically, changing entries in the global connector 220 dynamically changes how microblocks within the microengine 210 relate to one another. Because changing how microblocks relate to one another changes the functionality of the microengine, as described above, by changing the global connector 220, the functionality of the microengine can be dynamically changed.

A global connector may comprise more than one element. For example, the global connector 220 may be implemented as a microblock residing in a microengine 210 as well as in a core component. With reference to FIG. 1, microblocks can have corresponding core components, which are pieces of software that run on a core processor and may be used to configure the microblocks from the core processor. For example, in FIG. 1, a core component 104 operates in conjunction with the microblock 124, a core component 108 operates with the microblock 128, and a core component 110 operates in conjunction with the microblock 130. In some embodiments of the invention, a global connector 220 may reside in part on at least one microengine as a microblock, and reside in part on a core processor as a core component.

As illustrated in FIG. 2, each microblock 212, 214, 216 has of a number of inputs and outputs that may be identified with labels. The receiver driver 207, which operates as a source, and the transmit driver 237, which operates as a sink, are special in that they include only one labeled output (the source) or input (the sink). The other microblocks 212, 214, 216 all include input labels, 2, 4, 9, as well as output labels 3, 5, 7, respectively. Other embodiments may contemplate more or fewer labeled connections. Used in conjunction with the global connector 220, the input and output labels can dynamically define the topology of related microblocks in a microengine.

The global connector microblock 220 (or topology microblock) may include a number of entries such as: input label, input block, output label, and output block, which can define the network processor topology of the microblocks within the microengine. In this manner, a topology of the microblocks 212, 214, and 216 can be assembled to provide a particular function 210 for the network processor 200, or reassembled to provide a different function.

Figure 3:
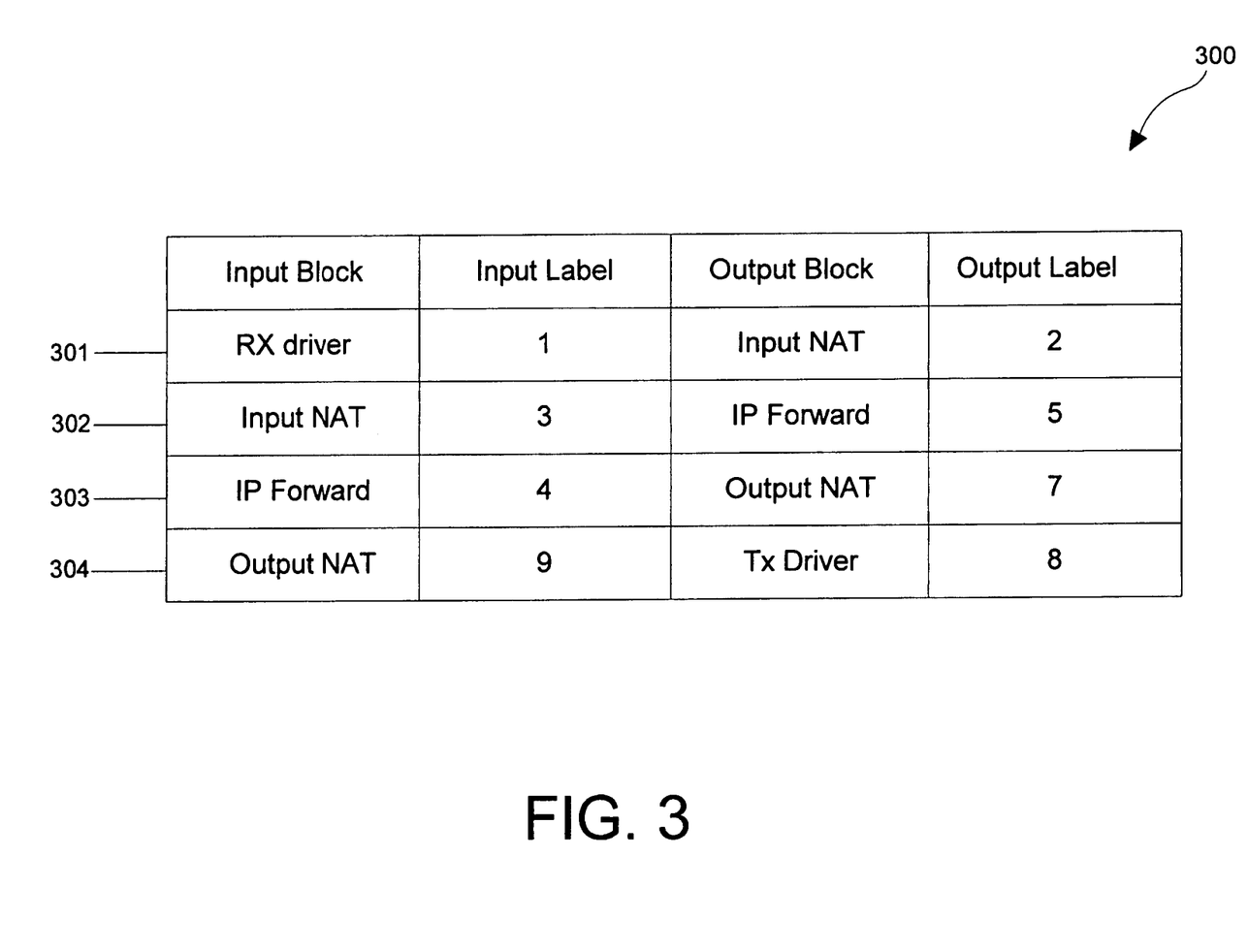
FIG. 3 is a table illustrating a topology table used in embodiments of the invention.

An example of such a topology table that may be used by the global connector microblock 220 is illustrated in FIG. 3, which is read in conjunction with FIG. 2.

FIG. 3 is a chart that illustrates a connector table 300 representing microblock topology within the microengine 210. In particular, the table 300 illustrates the topology of the NAT function 210 of FIG. 2 as implemented in the microengine 210 using entries in the global connector microblock 220. As stated above, the global connector 220 may dictate the topology in which the microblocks are linked or chained. To change the topology of the microblocks, entries in the connector table 300 can be changed.

Referring to FIG. 3, table 300 illustrates the topology of the microblocks similar to the representation in FIG. 2. In row 301, the input label "1" connects the receiver driver 207 to the global connector 220 microblock, while the output "2" connects the global connector 220 to the input NAT microblock 212. In row 302, the input NAT 212 is connected to the global connector 220 through the input label "3", while the global connector 220 is connected to the IP forward microblock 214 through the output label "5." In row 303, the microblock IP forward 214 is connected to the global connector 220 through the input label "4", while the global connector 220 is connected to the output NAT microblock 216 through the output label "7." Finally, row 304 illustrates that the output NAT microblock 216 is coupled to the global connector 220 through the input label "9," and that the global connector 220 is coupled to the transmit driver 237 through the output label "8."

Note that the input and output labels are effectively arbitrary and are separate from any meaning of the labels themselves. For instance, although numbers are used as the connection labels in FIGS. 2 and 3, the logical flow of the function 210 need not progress in numerical order. Order in which the microblocks 212, 214, and 216 are related is instead controlled by the entries in the topology table of the global connector microblock 220. In this regard, the global connector microblock 220 essentially operates as a switch that connects the different microblocks in a pre-determined manner. As described above, the global connector microblock 220 may also have a corresponding connector core component which will run on a core processor and can be used by an application to configure entries in the microblock table.

To change the topology of the microblocks, for example to remove the output NAT microblock 216, line 303 of the topology table 300 is modified to "8" in the output label. Further, line 304 can be deleted. This effectively causes the output of the IP forward microblock 214 to be coupled to the transmit driver 230. This, of course, changes the function of the microengine 210. Embodiments of the invention can make this change before the network processor 200 is operated, or the change can be made dynamically after the network processor 200 is running. Note that such a change does not require any modifications to existing microblocks.

Figure 4:
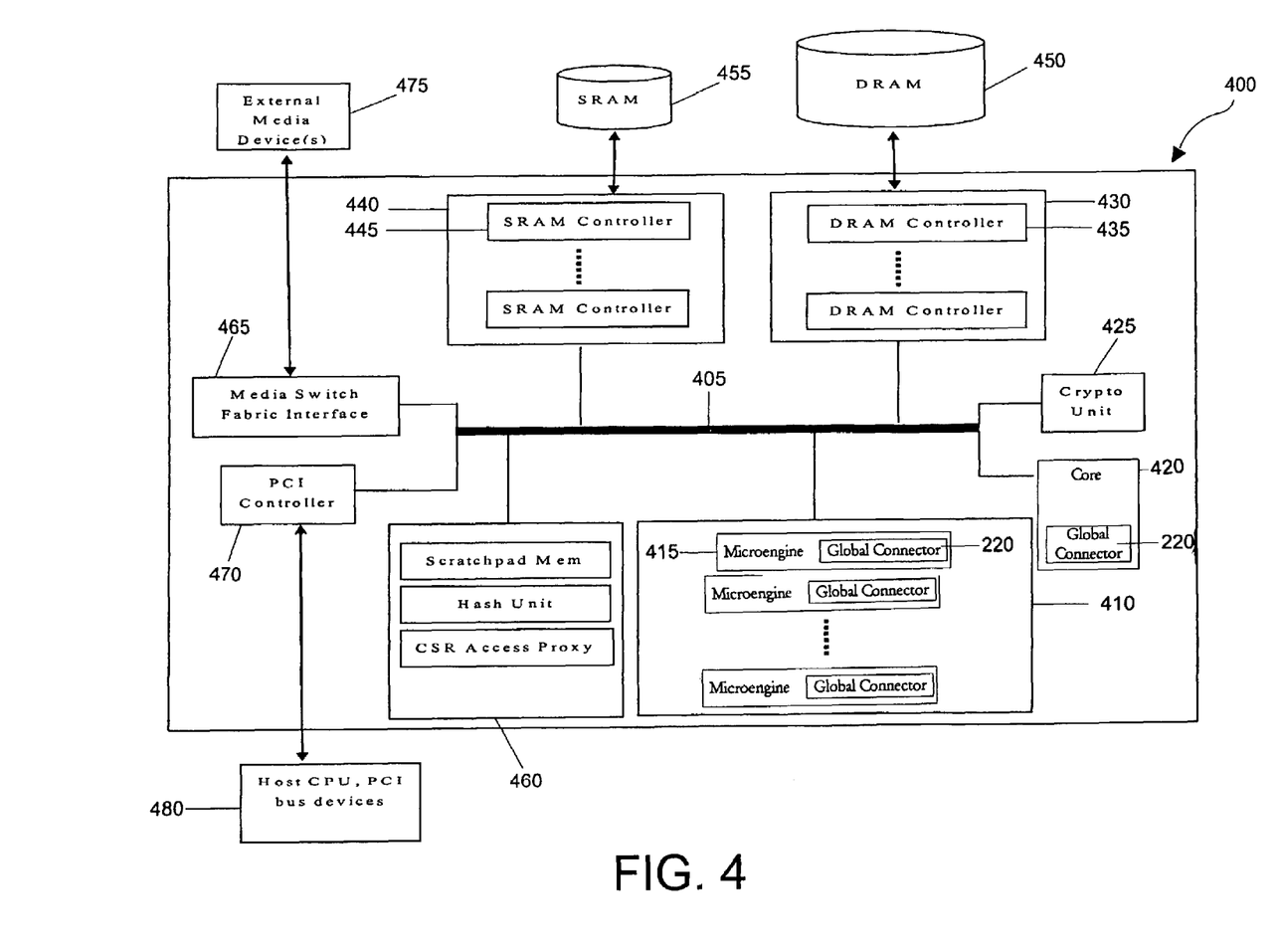
FIG. 4 is a block diagram of an exemplary network processor including dynamically configurable microblocks.

In FIG. 4 illustrates a network process 400 that includes embodiments of the invention. The network processor 400 includes a bus or other communication process 405 for communicating information, and a processor (or processes running on a processor) such as core processor 420. Also coupled to the bus 405 is a microengine block 410 including a number of microengines 415 for processing information, as described above. Also as described above, the microengines 415 may include one or more microblocks.

The network processor 400 further includes dynamic random access memory (DRAM) or other dynamically-generated storage device 450, which is coupled to a DRAM memory controller 435, or a series of DRAM controllers 430. An embodiment may further include a number of DRAM storage 450 devices.

The DRAM controllers 435 are also coupled to bus 405. The DRAM 450 are capable of storing information and instructions to be executed by core processor 420 and/or any of the microengine 415. The DRAM 450 also may be used for storing temporary variables or other intermediate information during execution of instructions by processor core processor 420 or any microengine 415.

The network processor 400 may also include static random access memory (SRAM) 455 coupled to a SRAM controller 445, or a series of SRAM controllers 440. Similar to that described above, some network processors 400 may include a number of SRAM 455 devices. The SRAM controllers 445 are then coupled with bus 405 for storing static information and instructions for core processor 420 and any microengine 415.

A PCI controller 470 may also be coupled to bus 405 for connecting network processor 400 to a host CPU or PCI bus devices 480. Likewise, the network processor 400 can also be coupled through the bus 405 to a media switch fabric interface 465, for communicating information with external media devices 475. An embodiment may comprise a functional block such as SHaC 460 containing any of on chip memory and functions such as scratchpad memory, a hash unit, or control status register access proxies. A scratchpad memory provides a small, low-latency memory interface to all of the microengines 415, and may be physically located within the SHaC 460. In the embodiment shown in FIG. 4, SHaC 460 is coupled with bus 405. The embodiment in FIG. 4 also includes a crypto unit 425 coupled with bus 405.

The exemplary network processor 400 of FIG. 4 can implement embodiments of the invention. For example, as described above, the global connector microblock 220 (FIG. 2) may include components operating on the core 420 and in one or more of the microengines 415. To be specific, the global connector microblock 220 would operate on a programmed one of the microengines 415 and manage how the various microblocks on the particular microengine 415 interrelate. The microengines 415 in themselves are generic, and, in some embodiments, it is by programming them (including the global connector microblock 220) that the dynamic service provision is implemented in the network processor 400.

An embodiment of the invention may include an apparatus including instructions that, when executed, cause a machine to dynamically configure a topology of microblocks within the global connector 220.

It is appreciated that a lesser or more equipped network processor than the example described above may be desirable for certain implementations. Therefore, the configuration of network processor 400 will vary from implementation to implementation depending upon numerous factors, such as price constraints, performance requirements, technological improvements, and/or other circumstances.

Although a programmed processor, such as core processor 420, or microengines 415, may perform the operations described herein, in alternative embodiments, the operations may be fully or partially implemented by any programmable or hard coded logic, such as Field Programmable Gate Arrays (FPGAs), TTL logic, or Application Specific Integrated Circuits (ASICs), for example. Additionally, the system of the present invention may be performed by any combination of programmed general-purpose computer components and/or custom hardware components. Therefore, nothing disclosed herein should be construed as limiting the present invention to a particular embodiment wherein the recited operations are performed by a specific combination of hardware components.

Figure 5:
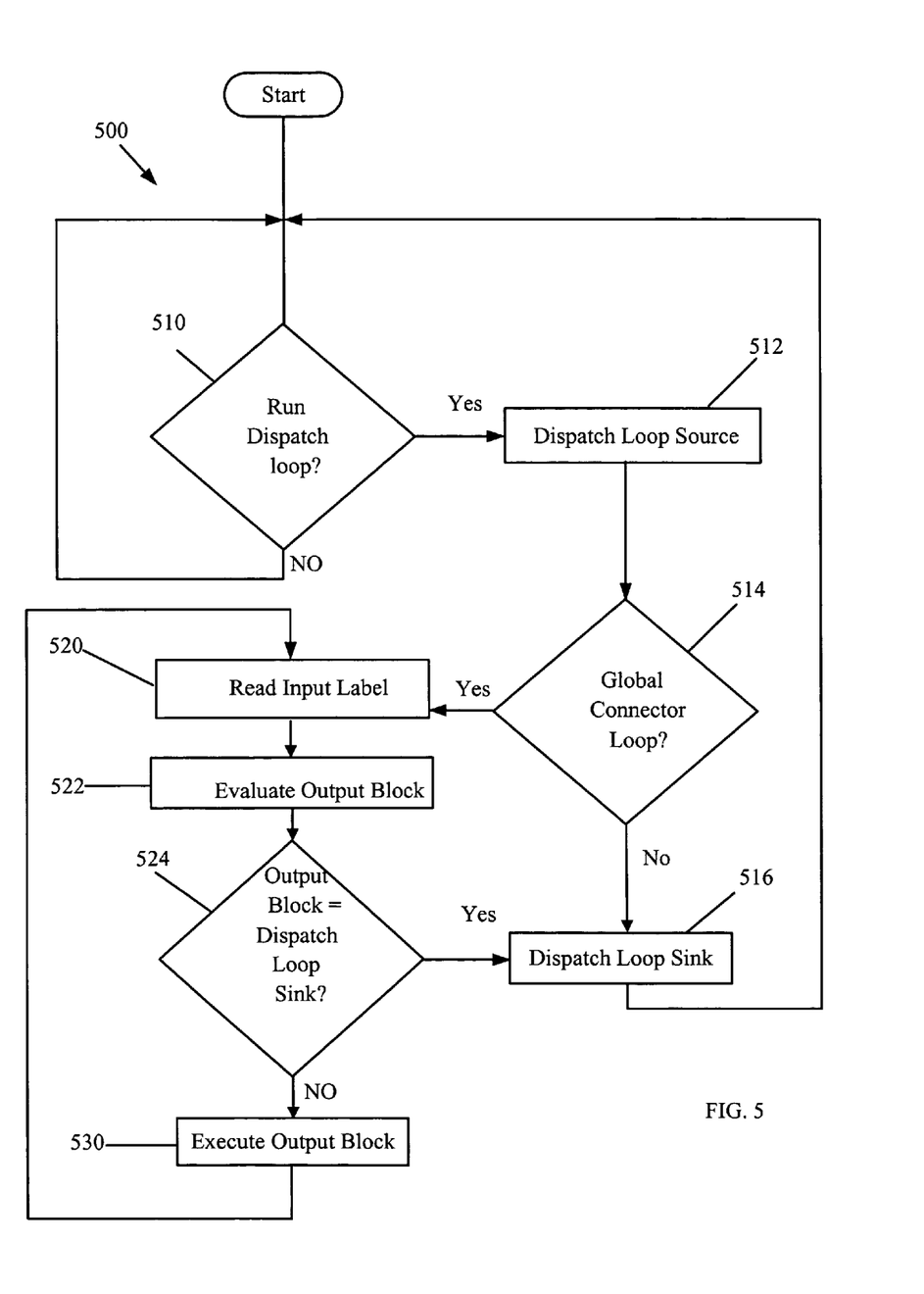
FIG. 5 is an example flow diagram illustrating processes used by embodiments of the invention.

FIG. 5 is an example flow diagram illustrating an example flow 500 according to inventive principles of this disclosure. The example method in FIG. 5 may begin with decision block 510 querying if the dispatch loop is to run. If the answer is yes, then a dispatch loop source call is conducted in block 512. After a dispatch loop source call, a decision block 514 queries if a global connector loop should run. If the response is no, then the method conducts a dispatch loop sink call in block 516 and loops back to the decision block 510.

If the result of the global connector loop query in block 514 is yes, then the flow 500 diverts to read input label block 520. After the read input label block 520, the flow 500 evaluates an output block in 522. A decision block 524 then queries if the output block equates with the dispatch loop sink. If the result of such a comparison is no, the flow 500 continues to execute an output block in block 530 and loops to the read input label block 520. Upon receiving a yes response to the query in decision block 524, the flow 500 continues to a dispatch loop sink call in block 516 and then loops back to the initial run dispatch loop query in decision block 510.

Example pseudo-code representing the flowchart in FIG. 5 may include the following:

```
// A dispatch loop with Global Connector microblock
while(1) {
    i = 0;
    dl_source( );
    while (i != 1) {
        i = gbl_connector( );
    }
    dl_sink( );
}
int gbl_connector ( )
{
    read input label;
    evaluate output block;
    if (output block == dl_sink) {
        return 1;
    } else {
        execute output block;
    }
}
```

The global connector 220 of FIG. 2 could dynamically add new code or microblocks on a network processor 400 (FIG. 4). An embodiment may integrate new microblock functionality in an existing data flow path network processor 400. This global connector concept is not limited to a network processor 400 environment or a microblock reconfiguration. It can also be applied in other single or multi-core processor environments, and light weight threaded environments as a generic software component. For example, it could be part of a process and allow light weight threads running different functionality to be dynamically added to the process at runtime.

Embodiments of the invention are not limited to a single computing environment. That is, the network processor may be a system of processing elements, buses, memories, I/O, etc. Moreover, the architecture and functionality of the invention as taught herein and as would be understood by one skilled in the art is extensible to other types of computing environments and embodiments in keeping with the scope and spirit of the invention. The invention provides for various methods, computer-readable mediums containing computer-executable instructions, and apparatus.

An embodiment method may include programming a component of a network processor during runtime, and providing dynamic service provisioning in the network processor. The present embodiment method may further include dynamically adding a microblock to the network processor. Additionally, this embodiment may include defining microblock topology of the network processor with input labels, input blocks, output labels and output blocks. Embodiments of the invention may allow dynamic provisioning at runtime without any modifications to existing microblocks of the network processor. The present embodiment may further include integrating new microblock functionality into an existing data flow path on the network processor.

An embodiment may include a network processor that includes a number of microengines to run multiple microblocks, a core processor connected with the microengines and a software component to run on at least one of the microengines and the core processor. The software component can provide dynamic topology change for the network processor. An embodiment may comprise multiple core processors.

An embodiment may include a software component that further provides the ability to dynamically add new microblocks to a network processor. The software component may provide an input label, and input block, and output label and an output block to define microblocks topology. Additionally, the software component may allow dynamic service provisioning at runtime without any modifications to existing microblocks. Dynamic service provisioning may include the ability to integrate new microblock functionality into an existing data flow path on a network processor.

As described above, embodiments of the invention may be in part performed by hard-wired hardware, or may be embodied in machine-executable instructions that may be used to cause a general purpose or special purpose processor, or logic circuits programmed with the instructions to perform the operations. Alternatively, the operations may be performed by any combination of hard-wired hardware, and software driven hardware.

The present invention may be provided as a computer program product that may include a machine-readable medium, stored thereon instructions, which may be used to program a computer (or other programmable devices) to perform a series of operations according to the present invention. The machine-readable medium may include, but is not limited to, floppy diskettes, optical disks, CD-ROM's, DVD's, magno-optical disks, ROM's, RAM's, EPROM's, EEPROM's, hard drives, magnetic or optical cards, flash memory, or any other medium suitable for storing electronic instructions. Moreover, the present invention may also be downloaded as a computer software product, wherein the software may be transferred between programmable devices by data signals in a carrier wave or other propagation medium via a communication link (e.g. a modem or a network connection).

Having illustrated and described the principles of our invention(s), it should be readily apparent to those skilled in the art that the invention(s) can be modified in arrangement and detail without departing from such principles. Inventive principles are therefore not limited to the examples in this description but should contain all modifications coming within the spirit and scope of the accompanying claims.

The invention claimed is:

1. A network processor, comprising:
   a plurality of microengines each to run one or more microblocks, each microblock including an elementary functional unit that provides packet processing functionality;
   a core processor connected with the plurality of microengines; and
   a dynamically alterable topology component running on at least one microengine and on the core processor, the topology component structured to store functional connection information about the microblocks, where the functional connection information dictates the topology in which the plurality of microblocks are linked to one another.

2. The network processor of claim 1 wherein the dynamically alterable topology component includes a connector table having one or more entries each comprising an input label, an input block, an output label, and an output block to direct data received by the network processor between the plurality of microblocks.

3. The network processor of claim 1 wherein more than one microblock can operate on a single microengine.

4. The network processor of claim 1 wherein at least one of the plurality of microengines is a RISC processor.

5. The network processor of claim 1 wherein the plurality of microengines are structured to be programmed by loading codes from a non-volatile memory.

6. The network processor of claim 1 wherein the topology component is modifiable while the network processor is in operation.

7. The network processor of claim 2 wherein the dynamically alterable topology component directs data between the plurality of microblocks by directing data received from a microblock associated with a particular input label and input block to a microblock associated with the output label and output block corresponding to the connector table entry having the particular input label and input block.

8. The network processor of claim 2 wherein an additional microblock can be added to the network processor by adding an entry to the connector table.

9. A system comprising:
   a collection of network processing engines operating on a computer network apparatus to perform operations to data packets received over a computer network connected to the computer network apparatus;
   a collection of microblocks structured to operate on the network processing engines, a first subset of the collection of microblocks structured to operate on a first of the collection of processing engines; and
   a connector microblock structured to operate on the first processing engine, the connector microblock including a connector table having dynamically alterable entries that specify connections among the collection of microblocks to arrange a data flow path between the microblocks so that a desired operation is performed on the received data packets.

10. The system of claim 9, further comprising:
    a core processor operating on the network apparatus; and
    a configuration component operating on the core processor, the configuration component structured to accept an input to modify the topology for the first subset of microblocks and, based on the input, to modify the alterable topology in the connector microblock.

11. The system of claim 10 wherein the configuration component can further add new microblocks to the first subset of microblocks.

12. The system of claim 9 wherein the dynamically alterable entries in the connector table each include an input label, an input block, an output label and an output block to dictate the topology in which the collection of microblocks are linked to one another.

13. A method comprising:
    receiving topology information for a collection of microblocks structured to operate on a microengine of a network processing device;
    populating entries in a connection label table in a connector microblock that is associated with the collection of microblocks with the topology information for the collection of microblocks;
    receiving a signal to change the topology of the collection of microblocks; and
    changing the entries in the connection table based on the signal to change the topology.

14. The method of claim 13 wherein changing the entries in the connection table comprises adding entries to the connection table.

15. The method of claim 13 wherein populating entries in a connection table comprises defining an input label, input block, output label, and output block.

16. The method of claim 13 wherein the topology information received for the collection of microblocks specifies an order in which the collection of microblocks are linked to provide a processing path for data received by the network processing device.

17. The method of claim 13 wherein changing the entries in the connection table occurs while the microengine is operating.

18. The method of claim 13, further comprising generating a signal to change the entries in the connection table from a process operating on a core processor.

19. An apparatus comprising a computer-readable storage medium containing instructions that, when executed, cause a machine to:
- receive topology information for a collection of microblocks structured to operate on a microengine of a network processing device;
- populate entries in a connection label table in a connector microblock that is associated with the collection of microblocks with the topology information for the collection of microblocks;
- receive a signal to change the topology of the collection of microblocks; and
- change the entries in the connection table based on the signal to change the topology.

20. The apparatus according to claim 19 wherein the instructions cause entries to be added to the connection table.

21. The apparatus of claim 19 wherein the instructions cause an input label, input block, output label, and output block to be defined in a connection table.

22. The apparatus of claim 19 wherein the instructions cause a core processor to generate a signal to change the entries in the connection table.

23. The network processor of claim 1 wherein at least one microblock is structured as a receiving driver to receive data packets over a computer network and wherein at least one other microblock is structured as a transmitting driver to transmit data packets.

24. The network processor of claim 23, wherein the plurality of microblocks further includes an input network address translation microblock, an internet protocol forward microblock, and an output network address translation microblock.

* * * * *